Oct. 11, 1966  N. J. POWELL  3,278,748
QUASI-STATIONARY WELL LOGGING METHOD AND APPARATUS
Filed Aug. 8, 1963  3 Sheets-Sheet 1

INVENTOR
NORMAN J. POWELL
BY *P.C. Johnston*
*Ralph L. Freeland Jr.*
ATTORNEYS

INVENTOR
NORMAN J. POWELL
BY
ATTORNEYS 3,278,748
QUASI-STATIONARY WELL LOGGING METHOD
AND APPARATUS
Norman J. Powell, Malibu, Calif., assignor to Chevron Research Company, a corporation of Delaware
Filed Aug. 8, 1963, Ser. No. 300,877
7 Claims. (Cl. 250—83.3)

The present invention relates to radioactivity logging and more specifically relates to a method to improve the statistical reliability of recordings of radiocative particles that originate in earth formations traversed by a borehole and then interact with a detector system in a logging sonde as it is continuously drawn through the borehole.

It is a primary object of this invention to improve the statistical reliability of such a logging record by relating only those radioactive particles from each of a plurality of depth intervals of known length to an assigned one of a plurality of recorders by a plurality of detectors that continuously move. Each detector is sequentially switched to one of a plurality of recorders so that, as the detectors move, the radioactive particles originating in one of the known depth intervals is recorded in a single recorder. In this way the record for each depth interval is made as though the logging tool was held stationary; hence, the method is called quasi-stationary nuclear well logging.

To use radioactivity particles to identify constituent nuclei of chemical elements that make up earth formations cut by a well bore, one must count enough random interactions between a radiation detector and the radioactive particles from the formation to make a statistically reliable record. Each interaction, known as an "event," can be detected in less than one microsecond ($10^{-6}$ sec.) but the time when these events occur is entirely random. Even when a large number of events occur in a short period of time, one must detect and count several thousand of these random events before the record can be considered statistically reliable. In particular, if one is to record a gamma ray pulse height spectrum, it is necessary to count on the order of 1000 nuclear events in each of 100, or more, channels to have a good statistical sample. Without good statistics the observer is unable to infer from such a pulse height spectrum what atoms probably generated the particle. This is because the "peaks" in such a spectrum represent small differences between several large numbers.

In radioactivity studies conducted in laboratories and above the earth's surface, generally, a detector can be held in a fixed place for a prolonged period of time—several minutes to hours—depending upon the intensity of the radiation. The needed statistical accuracy is then obtained by continuously recording radiation events over this extended time period.

In well logging, it is highly desirable to move continuously the tool that contains the detector system in the well bore. This is primarily because each stop increases the time that the drilling equipment is tied up. One of the most important costs of any well logging operation is the cost of tying up a drill rig, and particularly the skilled labor to run it. Hence, prolonged tests are not often made in wells. In the case of a freshly drilled borehole, especially where the formations are soft, there is also danger of sticking the logging instrument if it is stopped in the well bore.

Some improvement in this statistical problem has become possible by the use of scintillation detectors. As compared to the large gas-filled or vacuum tubes needed to form ionization chambers or Geiger counters, scintillation crystals are faster because of their small size and correspondingly greater density.

Even with scintillation detectors it is common practice to run radioactivity logging sondes in a well bore at low speeds and collect the radiation events in a single storage unit, frequently a multichannel pulse-height analyzer, over a given time period. These events, of course, come from the whole depth interval of the well bore over which the detector is moved during this given time period. The effect is that the record is an average of all the formations traversed during each collection period, and it represents a given range of depths that may include many different kinds of earth formations. Even at quite low logging speeds, say 20 feet per minute, each reading generally will represent several feet of earth formation. Usually one wishes to use a radioactivity well log to identify changes in earth formation, or a change in its fluid content, within a distance of the order of a foot. To get this resolution in present logging devices, it would be necessary to stop the logging tool every foot or so, or log at inordinately slow speeds. Neither of these alternates is considered commercially feasible.

By the method of the present invention, a quasi-stationary radioactivity logging method is made possible. And with this method the logging tool is continuously drawn through the well bore at a commercially useful speed. To use this invention, a plurality of radiation detectors, which desirably are scintillation detectors, but may be a plurality of miniature Geiger tubes, are positioned at known distances apart along the length of the logging sonde. Suitably, the number of detectors may be 10 or more, but of course this method can be performed with any number greater than one. The only practical limit is that the number of radiation detectors should be fitted into a logging sonde not over about 60 feet long. This space also must house the associated electrical equipment, including a similar plurality of electrical pulse storage units to which each radiation detector can be successively switched. In accordance with this method, then, as the logging tool traverses the well bore one individual recorder unit is effectively assigned to a fixed or given interval of formation depth that is equal to the distance between the detectors, and it collects radiation events only from this interval. All events from this interval are then stored in the assigned recorder by connecting it in sequence to each detector as it passes this same, given interval. Then, as the logging sonde draws one detector out of this given depth interval, the next adjacent detector enters the same known interval that the previous detector was in, and is switched to the counter unit assigned to that interval.

If, for example, 10 detectors are used and it is assumed, as in conventional practice, that the logging sonde is operated only while the tool is being drawn upwardly through the well bore, then the counter unit associated with the uppermost detector will successively have connected to it each of the succeeding 9 other detectors. All of the radiation events from the 10 detectors are stored in that counter unit and all have come from the same depth interval as that originally "seen" by the uppermost detector. When the lowermost detector has passed that same interval and all counts from the 10 detectors are stored in the assigned storage unit, the accumulated record is read out to the earth's surface. The procedure is, of course, repeated continuously with the entire system being cycled to successively read out electrical pulses stored in the 10 counter units. The period between switching each depth interval storage unit from one detector to another is dependent upon time required for a detector to be drawn over the known depth interval. This is measured by the length of cable reeled in at the earth's surface. A signal is generated at the earth's surface and sent to a switching unit located in the logging sonde to cycle the detectors successively to the multiple counter units when a given depth interval has been traversed by each detector. Obviously, the number of counts corresponding to a given depth accumulated by my quasi-stationary logging system at a given logging speed, will be proportioned to the number of detectors scanning the given depth interval.

Further objects and advantages of the present invention will become apparent from the following description when taken in conjunction with the accompanying drawings.

Figures 1, 2:
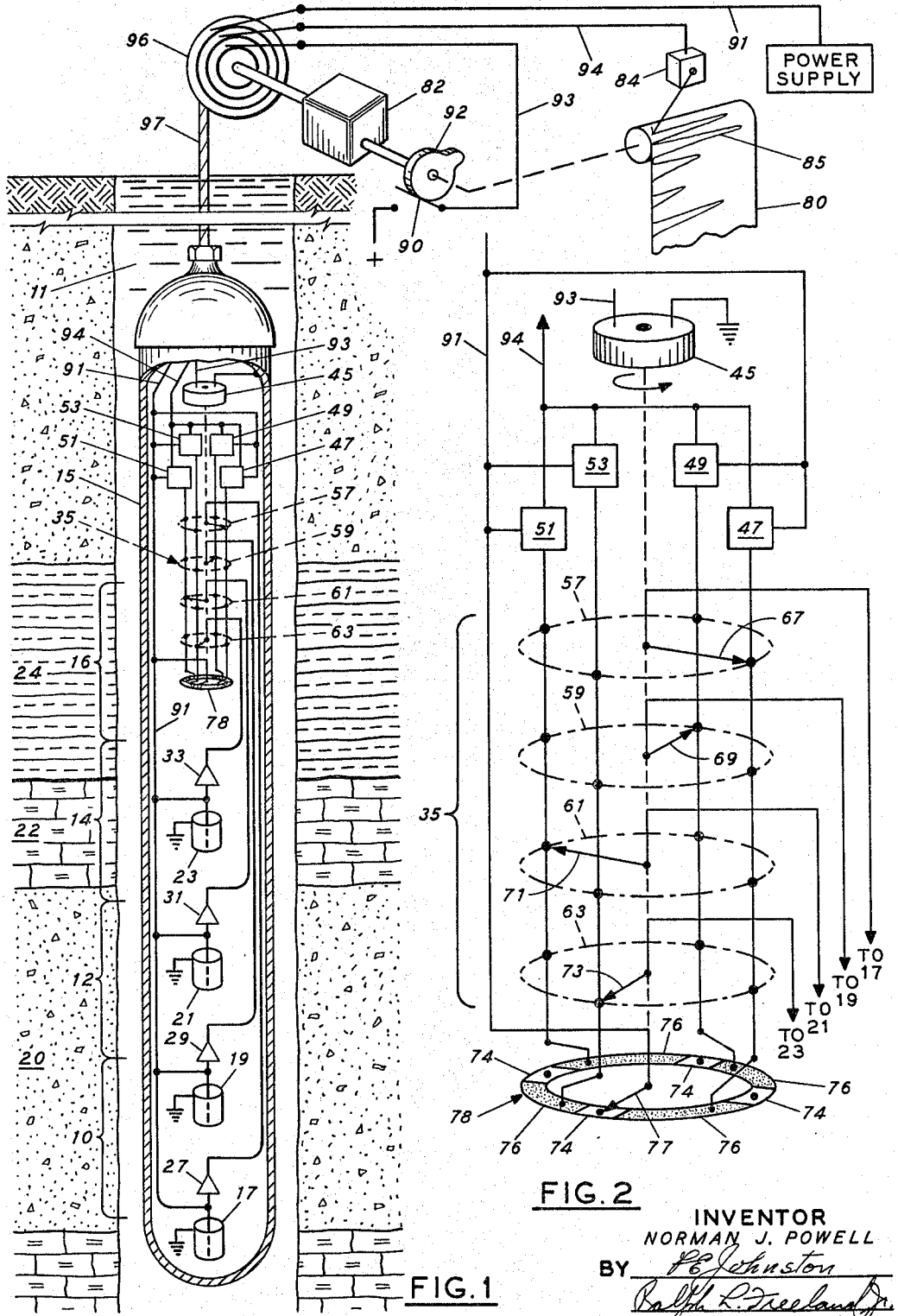
FIG. 1 is a schematic representation of a well logging sonde adapted to record natural radioactive particles originating in known intervals of earth formation along the well bore, in the practice of the method of this invention.
FIG. 2 is an enlarged view of the preferred form of switching arrangement shown in FIG. 1 to interconnect a plurality of pulse count units to the plurality of radiation detectors. For clarity in explanation, this system has been shown as including a combination of only 4 detectors and 4 counters.

Reference is now made to the drawings and in particular to FIG. 1. The quasi-stationary radioactivity logging method of this invention is illustrated as being applied to a system for recording natural gamma rays that originate in a plurality of known depth intervals indicated as lengths 10, 12, 14, and 16 along the length of borehole 11. The depth intervals 10, 12, 14, and 16 are indicated as being of substantially equal length. As indicated, geological formations 20, 22, and 24 may vary in thickness. To detect geological changes in such formations it is desirable to have the recorded depth intervals relatively short compared to the formation thickness. As will be explained more fully below, the length of intervals 10, 12, 14, and 16 is entirely determined by the spacing of detectors 17, 19, 21, and 23 within logging sonde 15. Thus, as sonde 15 is continuously drawn through borehole 11, each of the known depth intervals, from which nuclear events are received, is independent of the rate at which the intervals are passed by logging sonde 15.

Since the apparatus of FIG. 1 is designed to detect only natural gamma radiations rising from radioactive isotopes of materials such as thorium, uranium, and potassium present in earth formations 20, 22, 24, and 26, no artificial radiation source is required in logging sonde 15. The detection system then comprises a plurality of detectors. In the present illustrative embodiment of my quasi-stationary logging method, only four detectors are used. In practice, as many as ten or more detectors are quite feasible, particularly if the detectors are in the form of Geiger tubes that are radiation-sensitive.

One suitable form of such detector is a tube having dimensions of about 0.344 inch diameter and 1⅞₆ inches long. Such a tube is a Type 6213 manufactured by EON Corporation of Brooklyn, New York. Upon interaction of a radioactive particle with the tube, an electrical pulse, generally known in the art of radiation detection as an "event," creates an electrical pulse that is amplified by one of the corresponding amplifiers 27, 29, 31, or 33. This pulse is then transmitted through a suitable distribution system, identified generally as gang switch 35, to one of the recorder units 47, 49, 51, or 53.

It will be seen that gang switch 35 includes a corresponding plurality of wafers 57, 59, 61, and 63, each of which corresponds to one of the detectors 17, 19, 21, or 23. Switch 35 is operated by motor 45 that is pulsed each time that one of the detectors has fully traversed the distance along the well bore identified as the intervals 10, 12, 14, and 16; as mentioned above, this is exactly the distance between detectors 17, 19, 21, and 23.

The detailed operation of gang switch 35, and the way in which the pulses are distributed from the detectors, are best seen in FIG. 2. In the position shown in FIGS. 1 and 2, detector 17, for example, and its associated amplifier 27 are connected to the central tap, or rotating contact, 67 of wafer 57, so that all of the pulses from 17 are being put into recorder 47. At the same time, all of the pulses from detector 19 are being stored in recorder 49 through contact 69 of wafer 59. In the same way, pulses from detectors 21 and 23 are respectively being stored in recorders 51 and 53. As indicated, all of the contacts 67, 69, 71, and 73 are ganged together and driven by motor 45 in a counterclockwise direction, so that upon completion of the traverse of, say, detector 23 through interval 14, detector 21 will be switched by contact 71 to recorder 53. At the same time, detector 19 will be switched to recorder 51 and detector 17 will be switched to recorder 49, and detector 23 will be switched back to recorder 47. However, just prior to the switching of detector 23 to recorder 47, movable contact 77 of readout switch 78 applies a prolonged operating potential from power supply line 91 to recorder 47. This potential energizes recorder 47 to print-out the total number of nuclear events accumulated in recorder 47 on chart record 80 through line 94.

For readout of recorder 47 to the surface, the leads from each recorder 47–53 are connected to elongated segments 76. It will be seen that contact 77 dwells on segments 76 during rotation of switch 35 from one position on an insulated segment 74 to the next by motor 45. Strip record 80 is driven through gear-reducing arrangement 82 and measures the exact position of logging sonde 15 in well bore 11. While in the arrangement of FIG. 1 the total count from each recorder 47, 49, 51, and 53 is indicated as an analog signal represented by the length of bars 85, the results may also be printed out in the form of numbers. Print-out of the length of lines 85 is through galvanometer 84 which responds to the signal amplitude transmitted through line 94 from contact 77 of switch 78.

To step the individual switches to transfer detectors 17, 19, 21, and 23 to the correct recorder, motor 45 is operated by pulsing switch 90. Switch 90 is operated by a cam 92; it is also driven in synchronism with the position of logging sonde 15 through gear reducer 82. Both paper record 80 and cam 92 are synchronized with the position of logging cable 97 and sonde 15 by sheave 96 over which cable 97 runs sonde 15 in and out of hole 11. As mentioned above, switch 90 closes each time cable 97 moves a distance equal to the space between detectors 17, 19, 21, and 23. Thus, independently of the rate at which cable 97 is reeled in, recorders 47, 49, 51, and 53 receive exactly the events from the given depth intervals, such as 10, 12, 14, and 16.

Figure 3:
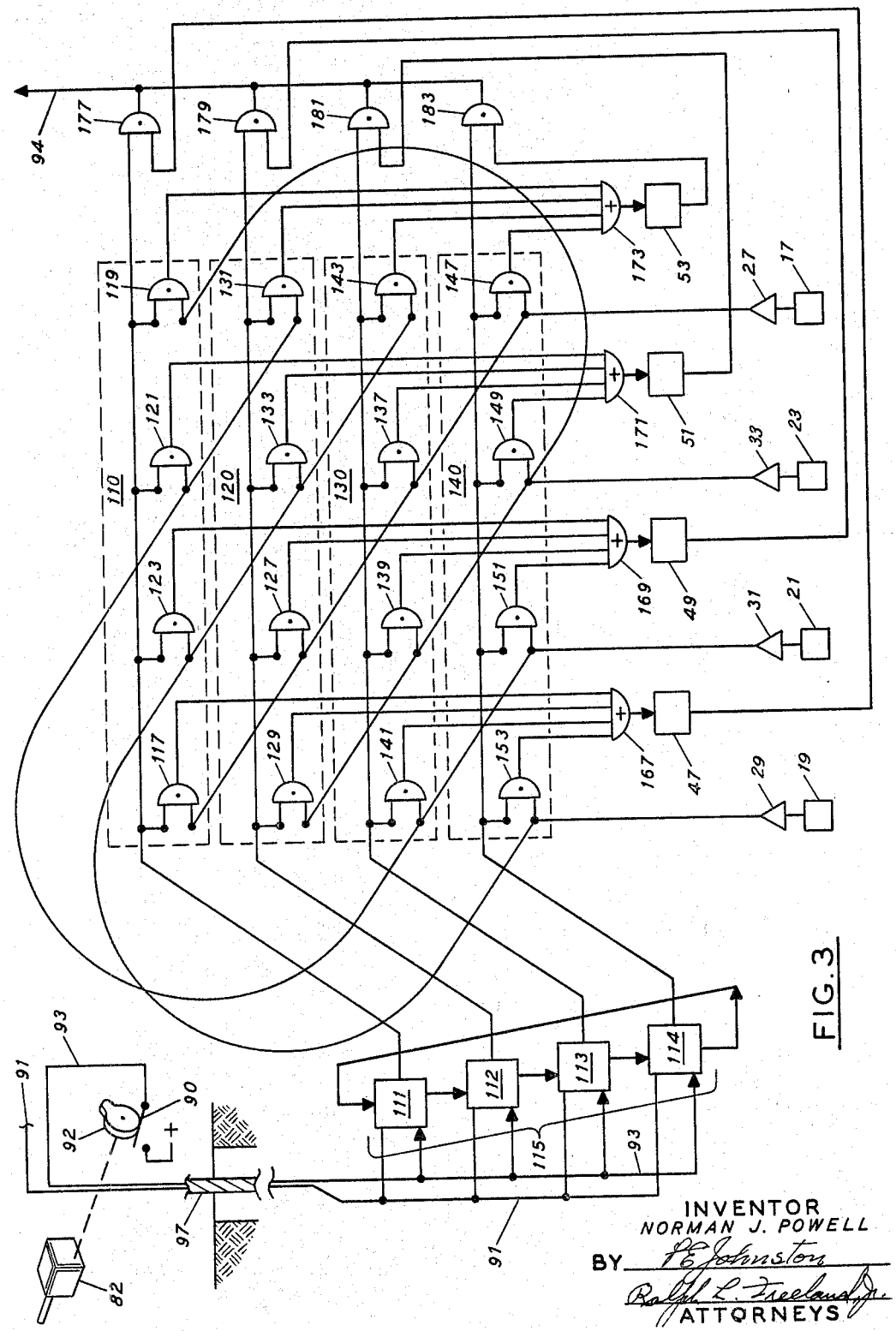
FIG. 3 is an alternate switching arrangement to interconnect the plurality of detectors to the depth interval storage units using an electronic switching arrangement comprising AND gates and OR gates to control the sequential switching.

FIG. 3 illustrates an alternate switching arrangement to interconnect each of the plurality of detectors to the multiple storage units. This switch is an electronic arrangement, rather than mechanical, as in FIG. 1 and FIG. 2. To aid in understanding the arrangement of FIG. 3, it will be helpful to explain the operation of the individual switching units which are called "gates." The two forms of gates shown are known as AND gates, and OR gates.

AND and OR gates are well known elements in the computer art. They are usually represented by circular segments. Although different symbols are used, in detail, one widely used custom is to distinguish AND and OR gates by putting a dot in the AND gate, and a plus sign in the OR gate. The dot and the plus sign are symbolic of the way that the gates embody operations in mathematic logic. The AND gate gives an output only when all inputs are activated. If either input is zero, the output is zero. The output, therefore bears a logical similarity to the product in ordinary mathematics, which is zero if either the multiplier or multiplicand is zero. This gives a memorable meaning for the dot. (It is used in mathematics to signify "multiply.") However, AND gates do no necessarily emit the product of their inputs in a magnitude sense. Furthermore, AND gates can have many inputs, and not just two, as do the units used in FIG. 3.

OR gates are elements that give an output when any one of their inputs is activated. The analogy with the mathematical sum is evident. There is a finite sum if any one of a series of addends is finite. Here again, though, the analogy falls short in the magnitude sense. If only one, or if all the inputs of an OR gate are activated, the output may still be of just one given size.

With the above description of the AND and OR gates it will be seen that the output from detectors 17, 19, 21 and 23 and their associated amplifiers 27, 29, 31 and 33 are each connected to four of sixteen AND gates. For example, amplifier 27 is connected to AND gates 117, 127, 137 and 147. Similarly, amplifier 33 is connected to AND gates 119, 129, 139 and 149. Amplifiers 31 and 33 are each connected to four other, and separate, AND gates. Each of these AND gates requires at least two simultaneous inputs, as discussed above, before a pulse can be transmitted to one of the pulse storage units 47, 49, 51 and 53. As shown, each storage unit 47, 49, 51 and 53 is connected to its four associated AND gates through a single OR gate, respectively 167, 169, 171 and 173. Thus, each OR gate has four inputs, but as discussed above, an OR gate can, and is, actuated by a pulse from any one of the four AND gates connected to it. For example, if any one of AND gates 117, 129, 141 or 153 supplies a pulse to OR gate 167, it will pass this pulse to counter 47.

Switching detectors to their assigned recorders at the correct depth intervals is under the control of sonde position and through a ring counter arrangement 115 that includes four trigger pairs 111, 112, 113 and 114. The upper input terminal of each AND gate in row 110 is connected in common to the first of these two-state trigger pairs, 111. It will be noted that each of the trigger pairs has two inputs and two outputs. The left hand input is from a pulse source, such as that used in stepping the mechanical switch of FIGS. 1 and 2. This is cam 92 and switch 90 that supply D.C. pulses through line 93, and in common to all four trigger pairs. Ring counter 115 includes an arrangement whereby each trigger pair is sequentially activated, one at a time. The "ring" sequence is controlled by the upper input to each of the pair units 111, 112, 113 and 114. This input is also the output of the bottom line from its adjacent upper trigger pair. Of course, in the case of trigger pair 111, the top input is from the bottom output of trigger pair 114.

Operation of ring counter circuit 115 is as follows: At the beginning of operation, one of the trigger pairs, say 111, is in a conducting state and all others are in non-conducting states. As used in this sense, the conducting state means that that trigger pair continuously supplied an activating voltage to the output line of its corresponding row such as trigger pair 111 supplies to row 110; 112 supplies to 120; 113 to 130; and 114 to 140. In the conducting state the trigger pair can also accept a pulse from a pulse source to change its state from conducting to non-conducting. When the next pulse comes from the pulse source only the conducting pair can accept it. This changes its state to non-conducting and at the same time transmits a pulse through its downward output to change the state of the next lower trigger pair, 112, to the conducting state. Pair 112 then activates the line to row 120. The next pulse renders pair 112 non-conducting and makes pair 113 conducting. The action is continuous upon receipt of a pulse from the source such as line 93 each time switch 90 closes.

It will now be seen that if, for example, row 110 is activated, while rows 120, 130, and 140 are not activated, the storage units 47, 49, 51 and 53, will be fed from detector units 17, 19, 21 and 23 respectively. Then if row 120 is activated, the same storage units, 47, 49, 51, and 53 will be fed from detector units 23, 17, 19, and 21 respectively. Continuation of this reasoning shows that the connection sequence is as in Table I.

TABLE I.—DETECTOR TO STORAGE UNIT CONNECTIONS FOR VARIOUS ROW ACTIVATIONS IN FIG. 3

| Row Activated | Detector connected to storage unit 47 | Detector connected to storage unit 49 | Detector connected to storage unit 51 | Detector connected to storage unit 53 |
| --- | --- | --- | --- | --- |
| 110 | 17 | 19 | 21 | 23 |
| 120 | 23 | 17 | 19 | 21 |
| 130 | 21 | 23 | 17 | 19 |
| 140 | 19 | 21 | 23 | 17 |
| 110 Again | 17 | 19 | 21 | 23 |
| Etc | Etc. | Etc. | Etc. | Etc. |

Table I makes it evident that the connection sequence from the array of gates in FIG. 3 is cyclical just as is the connection sequence in FIG. 2. Therefore, the electronic switching arrangement represented in FIG. 3 can be substituted for the electro-mechanical switching arrangement represented in FIG. 2.

In the arrangement of FIG. 3, readout of the total counts accumulated in each of the four counters is through another AND gate, such as gates 177, 179, 181 and 183. These gates are also connected respectively in rows 110, 120, 130 and 140, but their second input is from counter units 47, 49, 51 and 53, respectively. In this arrangement, when the counter is connected to the lowermost detector in the logging sonde it is also connected simultaneously through its readout AND gate to send its stored input to the earth's surface for recording in the same manner as in the arrangement of FIG. 1.

Figure 4:
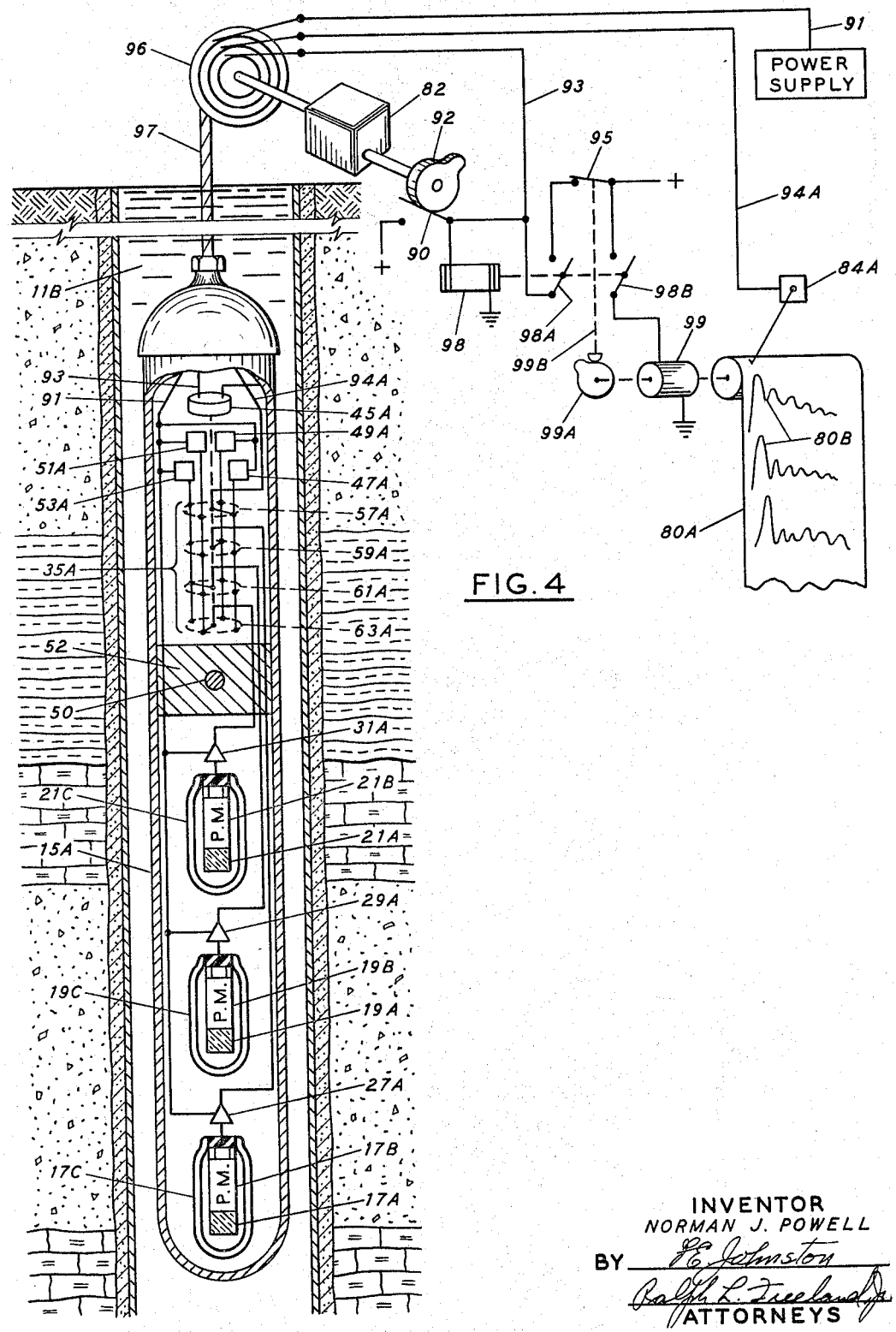
FIG. 4 is an alternative embodiment of apparatus to perform this invention, similar to FIG. 1, but includes apparatus to prolong the read-out time for each recorder, as is required when the recorders are multichannel analyzers for presenting a pulse-height spectrum for each known depth interval on the logging record.

FIG. 4 is a further embodiment of the invention as applied to a wellbore 11A that is cased with a steel liner 11B. To penetrate casing 11B, an artificial source of radioactivity 50 is used to generate neutron activated gamma rays that will create a pulse height spectra; the plurality of detectors are conventional scintillation counters, and to aid the readout problem, the pulse outputs of these detectors are sequentially fed to one more multichannel pulse height analyzer than there are detectors.

To create gamma rays in the earth formations, neutron source 50 is formed of Pl-Be, Po-Be, or Ra-Be. It is positioned within a shield 52 to absorb gamma rays and thermal neutrons from source 50 and to prevent generation of gamma rays in parts of logging sonde 15. Other radiation sources such as a neutron generator can also be used. Depending upon the nuclear events that are to be detected (fast, epithermal or thermal neutrons, or gamma rays), other shielding may also be used with the detectors. Such a shielding system is disclosed in detail in Jones and Meyerhof Patent 2,888,568, issued May 28, 1959.

In the present embodiment, the scintillation detectors comprise crystals 17A, 19A and 21A, and photomultiplier tubes 17B, 19B and 21B, suitably mounted in thermal insulation devices such as Dewar flasks 17C, 19C and 21C, respectively. The outputs of the scintillation detectors are supplied to the storage units by amplifiers 27A, 29A and 31A, in much the same manner as in FIG. 1. As further distinguished from the arrangement of FIG. 1, four wafers are used in the switch 35A to selectively and sequentially connect the three detectors to three of the four storage units 47A, 49A, 51A and 53A. The purpose of such a set-up is so that one wafer, such as 57A, can be used to connect one of the storage units, such as 47A, to the surface recording system through line 94A for a complete radiation count receiving interval. Such a prolonged dwell period is desirable to permit time for all channels, say 100, of a multichannel pulse height analyzer such as unit 47A to read out. At the same time, the other three counters, 49A, 51A and 53A, are accumulating pulses successively produced by the three crystals, 17A, 19A and 21A.

The accumulated pulse height spectrum in 47A is printed on chart 80A by the signal on line 94A operating galvanometer 84A. Paper 80A records each spectrum 80B at its related depth location. This relative location is produced by stepping motor 99. It turns paper 80A a fixed distance each time switch 90 is closed by cam 92. Relay 98 is thus energized each time sonde 15A and cable 94A travel the predetermined distance (the distance between detectors 17A, 19A and 21A). Contact 98A seals in relay 98 and through contact 98B supplies power to motor 99. After one revolution of motor 99, cam 99A lifts follower 99B to open momentarily switch 95. This stops motor 99 until the next impulse from switch 90 closes relay 98. Switch 95 momentarily opens when cam 96 lifts follower 97.

Various modifications and changes in my preferred forms of apparatus to perform my method will occur to those skilled in the art. Among such changes that are within the scope of this invention is the positioning of the pulse storage units at the earth's surface and transmitting electrical pulses from the radiation detectors over one or more coaxial cables. With such an arrangement, the preferred position of the switching mechanism would be at the earth's surface, so that the sonde-position detecting means to which the switching mechanism is responsive would not require a conductor to energize the stepping switch 45. Other changes in apparatus and procedures that come within the scope of the appended claims are intended to be covered thereby.

I claim:

1. A method of recording a statistically reliable number of radiation events from a plurality of given intervals of earth formation cut by a borehole while continuously traversing said intervals with a logging sonde which comprises:
   (a) positioning a plurality of radiation detectors with known relative displacements in the axial direction along said sonde,
   (b) initially connecting individual members of a plurality of electrical pulse storage units to individual members of said plurality of radiation detectors so that each of said storage units receives signals relatable to a given formation interval, and
   (c) switching the connections between said individual storage units and said individual radiation detectors, in accordance with the movement of said sonde, so that a given individual storage unit is switched from a first individual detector to which it was initially connected to that individual detector which has replaced said first individual detector opposite said formation interval from which said given individual storage unit initially received signals.

2. A method of recording a statistically reliable number of radiation events from a plurality of given intervals of earth formation cut by a bore hole while continuously traversing said intervals with a logging sonde which comprises:
   (a) positioning a plurality of radiation detectors with known relative displacements in the axial direction along said sonde,
   (b) initially connecting individual members of a plurality of electrical pulse storage units to individual members of said plurality of radiation detectors so that each of said storage units receives signals relatable to a given formation interval, and
   (c) switching the connections between said individual storage units and said individual radiation detectors each time said logging sonde has moved a distance equal to the axial distance between said detectors, said switching being sequenced so that:
   (d) the one of said storage units that has been receiving signals from the rear detector is reconnected from said rear detector to the forward detector, the designations rear and forward being with respect to the motion of the sonde, and
   (e) at least another of said storage units is switched from one of said detectors to which it has been connected to the next more rearward of said detectors.

3. A method of recording a statistically reliable number of radiation events from a plurality of given intervals of earth formation cut by a borehole while continuously traversing said intervals with a logging sonde which comprises:
   (a) positioning a plurality of radiation detectors with known relative displacements in the axial direction along said sonde,
   (b) initially connecting individual members of said plurality of radiation detectors to individual members of a larger plurality of electrical pulse storage units, leaving at least one member of the larger plurality of storage units not connected to a detector and available for connection to a readout device,
   (c) switching the connections between said individual storage units and said individual radiation detectors each time said logging sonde has moved a distance equal to the axial distance between said detectors, said switching being sequenced so that:
   (d) at each switching time, the one of said storage units that has been receiving signals from the rear detector is connected to said readout device, the designations rear and forward being with respect to the motion of said sonde,
   (e) at the same said switching time, another of said storage units that has been connected to said readout device is connected from said readout device to the forward detector, and
   (f) at the same said switching time, others of said storage units that have been connected to detectors, other than said rear detector, are reconnected to the next more rearward detector.

4. In the art of radiation well logging, the method of collecting a statistical sample of nuclear events originating in a known depth interval of earth formation traversed by a well bore as if a radiation detector were stationary adjacent said known depth interval during a given time interval comprising
   (a) continuously traversing said known depth interval with a plurality of nuclear event detectors, said plurality of detectors being axially separated from each other by a distance substantially equal to said depth interval,
   (b) cyclically switching said detectors to a pulse storage unit so that only the one of said detectors that is opposite said given depth interval is connected to said pulse storage unit, and the switching period is the time required for one of said detectors to traverse said depth interval, and
   (c) recording the total number of events recorded in said storage unit at the end of said given time interval whereby said given time interval over which nuclear events are collected from said depth interval is the sum of all switching periods during which said plurality of radiation detectors traversed said depth interval and were connected to said pulse storage unit.

5. A quasi-stationary method of recording electrical pulses representative of the energy of nuclear events created in a given depth interval of earth formation traversed by a well bore which comprises
   (a) assigning at least one electrical pulse-height storage unit to a given depth interval along said well bore, (b) positioning a plurality of radiation detectors separated from each other by equal distances in said well bore, (c) drawing said detectors past said formation depth interval, and (d) sequentially connecting said radiation detectors to said pulse-height storage unit, (e) said connection of said detectors to said storage unit being made one at a time, and transfer of said storage unit being from one detector to the next in accordance with the position of said detectors relative to said given depth interval and such that only that detector then opposite said depth interval is connected to said pulse-height storage unit, and (f) recording the output of said pulse-height storage unit when all of said radiation detectors have traversed said well bore through said given depth interval.

6. Well logging apparatus for recording improved pulse-height spectra from gamma-ray energies representing nuclei of unknown elements in an earth formation traversed by a well bore which comprises means for irradiating said earth formation with neutrons to generate gamma rays in the unknown nuclei in the earth formation, a plurality of gamma-ray detectors axially spaced from each other and from said neutron source, a plurality of electrical pulse-height storage units, and means for sequentially interconnecting said gamma-ray detectors to one said pulse-height storage units, said interconnecting means including means operable in response to the position of said gamma-ray detectors for electrically transferring the outputs of said detectors to said storage units one at a time, and means for recording the total number of pulses stored in each of said storage units after a plurality of said gamma-ray detectors have been sequentially connected to said storage unit whereby the statistical accuracy of the gamma rays recorded during traverse of a known depth of earth formation is improved in its statistical reliability.

7. The method of quasi-stationary well logging to record a statistically reliable indication of random radioactive events occurring in known depth intervals of earth formation traversed by a wellbore which comprises:

(a) vertically spacing a plurality of radiation detectors in an axial array along a wellbore, (b) traversing said known depth interval with said plurality of detectors, (c) successively switching the electrical output of each of said detectors to a corresponding one of a plurality of event storage units in response to the movement of said plurality of detectors over a distance equal to the separation between said detectors, each of said storage units being at least temporarily identifiable with a known portion of said depth interval equal to the separation between said detectors, (d) accumulating in each of said storage units the output of each of said detectors as it traverses said known portion of said depth interval, said accumulations being statistically reliable samples of the random events successively detected by each of said plurality of detectors in succession as it traverses said known portion of said depth interval, (e) and recording the accumulations in each of said storage units in accordance with the depth of said known portion of said depth interval after all of said plurality of detectors have passed said known portion, the order of switching of said detectors to one of said storage units being such that the next detector in said array connected to a storage unit is away from the direction said array is traversing said well bore relative to said known depth interval.

References Cited by the Examiner
UNITED STATES PATENTS
2,284,345   5/1942   Schlesman _____ 250—83.6

RALPH G. NILSON, *Primary Examiner.*

M. ABRAMSON, *Assistant Examiner.*